United States Patent [19]

Swaters et al.

[11] 4,001,098

[45] Jan. 4, 1977

[54] COMPOSITIONS CURABLE BY EXPOSURE TO ULTRA VIOLET LIGHT IN THE PRESENCE OF CHLORO-SUBSTITUTED ACETOPHENONES

[75] Inventors: Pieter Dirk Swaters, Lochem; Reginoldus Havinga, Schalkhaar; Tjerk van der Hauw, Diepenveen, all of Netherlands

[73] Assignee: Akzona Incorporated, Asheville, N.C.

[22] Filed: June 30, 1975

[21] Appl. No.: 592,020

Related U.S. Application Data

[63] Continuation of Ser. No. 427,710, Dec. 26, 1973, abandoned.

[52] U.S. Cl. .................. 204/159.23; 96/115 P; 204/159.15; 204/159.18; 260/901; 427/54
[51] Int. Cl.² .................. C08F 2/46; C08F 4/00; C08F 2/50; C08F 4/32
[58] Field of Search ............... 204/159.23, 159.14, 204/159.15; 96/115 P

[56] References Cited

UNITED STATES PATENTS

| | | | |
|---|---|---|---|
| 3,121,633 | 2/1964 | Sprague et al. | 96/48 QP |
| 3,552,986 | 1/1971 | Bassemir et al. | 204/159.23 |
| 3,769,023 | 10/1973 | Lewis et al. | 96/115 P |
| 3,801,329 | 4/1974 | Sandner et al. | 204/159.23 |

*Primary Examiner*—Richard B. Turer
*Attorney, Agent, or Firm*—Stevens, Davis, Miller & Mosher

[57] ABSTRACT

Compositions which are curable with ultra violet light comprise a polyester containing ethylenic unsaturation and a chloro-alkyl acetophenone or chloro-alkoxy acetophenone photocatalyst.

10 Claims, No Drawings

COMPOSITIONS CURABLE BY EXPOSURE TO ULTRA VIOLET LIGHT IN THE PRESENCE OF CHLORO-SUBSTITUTED ACETOPHENONES

This is a continuation of application Ser. No. 427,710, filed Dec. 26, 1973 and now abandoned.

The present invention relates to a process for the preparation of compositions curable by ultra violet light which contain ethylenic unsaturation and to compositions substantially comprising such compounds.

Compounds having at least two structural units of the formula:

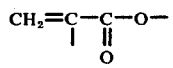

may be obtained by esterifying acids containing such a unit, for instance, acrylic acid or methacrylic acid, or by transesterifying esters of these acids with polyhydroxy compounds. Polyhydroxy compounds which may be used include any suitable polyhydric alcohol, such as, for example, dihydric alcohols including ethylene glycol and propylene glycol, trihydric alcohols, such as trimethylolpropane, and polyhydroxy compounds as described for example in German Offenlegungsschrift No. 2,102,382, which compounds also contain one or more other functional groups in addition to the hydroxy groups.

It is known that di- or polyesters of acrylic acid or methacrylic acid and a di- or polyhydric alcohol may be cured by irradiation with ultraviolet light. In order to achieve quick curing, this should take place in the presence of a photocatalyst. For this purpose, halogenated aromatic, halogenated alicyclic and halogenated aliphatic compounds are recommended in U.S. Pat. No. 3,551,235. In these halogenated aromatic or halogenated alicyclic compounds, for example halogenated benzenes or perchloropentacyclodecane, the halogen atom is directly bound to the ring. 2-Bromoethylmethyl ether is mentioned as a halogenated aliphatic compound.

It has now been found that compounds having the general formula:

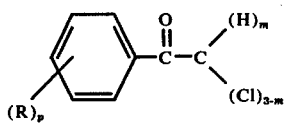

wherein $m = 0$, 1 or 2 and $p$ represents an integer of from 1 to 5 and wherein, when $p = 1$, R represents an alkyl or alkoxy group having at least 4 carbon atoms and, when $p>1$, R is an alkyl or alkoxy group having together at least 4 carbon atoms, are excellently suited for use as photocatalysts in the curing of compounds having at least two structural units of the formula:

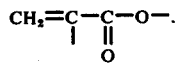

It has been found that compounds having the general formula I hereinbefore defined possess a high catalytic activity and do not have any disadvantageous effect on the stability of compositions which contain these compounds and compounds having at least two structural units of the formula:

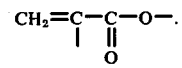

Illustrative examples of compounds according to the general formula I hereinbefore defined are: 2-chloro-4'-tert.-butylacetophenone; 2,2-dichloro-4'-tert.butylacetophenone; 2,2,2-trichloro-4'-tert.butylacetophenone; 2-chloro-4'-octylacetophenone; 2,2-dichloro-4'-octylacetophenone; 2-chloro-4'-n-$C_{8-13}$ alkylacetophenone; 2,2-dichloro-4'-n-$C_{8-13}$ alkylacetophenone; 2,2,2-trichloro-4'-n-$C_{8-13}$ alkylacetophenone in which the alkyl groups range from 8 to 13 carbon atoms; 2,2-dichloro-4'-octyloxyacetophenone; 2,2,2-trichloro-4'-octyloxyacetophenone; 2,2-dichloro-2',4'-diisopropylacetophenone; 2,2,2-trichloro-2',4'-diisopropylacetophenone and the like or mixtures of these compounds. The preferred compositions which may be cured under the influence of the photocatalysts according to the invention consist mainly of a di- or polyester of acrylic acid or methacrylic acid with a di- or polyhydric alcohol, such as trimethylolpropane trimethacrylate or 2,2-bis-(4-methacryloyloxyethoxyphenyl)propane. If desired, polymerisable compounds, for example, acrylic acid, methacrylic acid or esters thereof, or a resin, for example, toluene-sulfonamide-formaldehyde resin, may be incorporated into compositions according to the invention.

The compositions according to the invention are excellently suited for use as binders in lacquers or printing inks. In this case, the usual auxiliary agents used in printing, for instance carbon black or other pigments and coloring agents, are first incorporated into the composition in the usual quantities, after which a printing ink may be obtained by incorporation into or addition of a solvent to the composition thus obtained. Further, the usual driers or siccatives, for example cobalt soaps, and other additives, such as triethanolamine, may be added to these printing inks.

Printing inks containing photocatalysts according to the invention may be applied to any substrate, such as paper, metal, wood, textile or synthetic material, and may be cured thereon by irradiation with ultraviolet light in a very short time.

Any catalytic amount of the photocatalyst may be used. Usually, the photocatalyst is added in quantities of 0.5–10% by weight, preferably 1–5% by weight, calculated on the compound to be cured or mixtures of these compounds.

The following Examples illustrate the invention.

EXAMPLE I

The photocatalysts mentioned in Table 1 below were added at a temperature of about 70° C. to a composition consisting of trimethylolpropane trimethylacrylate (TRIM), mixed with a toluene sulfonamide formaldehyde resin (Santolite MHP), if desired, in the ratio indicated in Table 1. After the optional addition of triethanolamine, the mixtures were spread on glass plates to form film layers having a thickness of 6–8 microns. These layers were covered with a transparent sheet and subsequently irradiated with ultraviolet light from a Philips HTQ-4 high pressure mercury lamp at a distance of 20 cm. for a long enough time for the film layer to become tack-free. The irradiation times for a tack-free state are tabulated in Table 1. Subsequently, the film layers were dried in the air without ultra violet irradiation to a hard-dry state.

The stability of the mixture on storage in the dark at room temperature was determined by measuring the viscosity. This was determined by measuring the time needed for a steel ball, weighing 33 mg. and having a diameter of 2.0 mm., to fall 130 mm. through a vertical column of the mixture. After 3 weeks, no change in viscosity could be observed.

TABLE 1

| TRIM | Santolite MHP | photocatalyst | quantity by weight | tack-free after (sec.) | remarks |
|---|---|---|---|---|---|
| 100 | | none | | >60 | |
| 96 | | 2,2,2-trichloro-4'-tert.butyl-acetophenone | 4 | 2 | |
| 50 | 50 | none | | >60 | |
| 48 | 48 | 2,2,2-trichloro-4'-tert.butyl-acetophenone | 4 | 3 | |
| 47 | 47 | 2,2,2-trichloro-4'-tert.butyl-acetophenone | 4 | 2 | * |
| 49 | 49 | 2,2,2-trichloro-4'-tert.butyl-acetophenone | 2 | 2 | |
| 49 | 49 | 2-chloro-4'-n-octylacetophenone | 2 | 30 | |
| 49 | 49 | 2,2-dichloro-4'-octyloxyacetophenone | 2 | 2 | |

*2 parts by weight of triethanolamine present.

EXAMPLE II

The photocatalysts mentioned in Table 2 below were added at a temperature of about 70° C. to a composition consisting of 2,2-bis(4-methacryloyloxy-ethoxyphenyl)propane (Diacryl), mixed with a toluene sulfonamide formaldehyde resin (Santolite MHP), if desired, in the ratio indicated in Table 2. The mixtures were treated in the same way as described in Example I. The results after curing with ultra violet irradiation are tabulated in Table 2.

The stability of the mixtures on storage in the dark at room temperature was determined in the way as described in Example 1. After 3 weeks, no change in viscosity of any of the mixtures could be observed.

TABLE 2

| Diacryl | Santolite MHP | photocatalyst | quantity by weight | tack-free after (sec.) | remarks |
|---|---|---|---|---|---|
| 100 | | none | | >60 | |
| 96 | | 2,2,2-trichloro-4'-tert.butyl-acetophenone | 4 | 1 | |
| 85 | 15 | none | | >60 | |
| 81.6 | 14.4 | 2,2,2-trichloro-4'-tert.butyl-acetophenone | 4 | 1 | |
| 64 | 32 | 2,2,2-trichloro-4'-tert.butyl-acetophenone | 4 | 2 | |
| 62.7 | 31.3 | 2,2,2-trichloro-4'-tert.butyl-acetophenone | 4 | 1 | 1) |
| 83 | 15 | 2,2,2-trichloro-4'-tert.butyl-acetophenone | 2 | 2 | |
| 83 | 15 | 2,2-dichloro-4'-n-alkyl-acetophenone | 2 | 4 | 2) |
| 83 | 15 | 2,2,2-trichloro-2',4'-diisopropyl-acetophenone | 2 | 2 | |

1) 2 parts by weight of triethanolamine present.
2) alkyl groups ranging from 8 – 13 carbon atoms.

Although the invention has been described in detail for the purpose of illustration, it is to be understood that such detail is solely for that purpose and that variations can be made therein by those skilled in the art without departing from the spirit and scope of the invention except as it may be limited by the claims.

What we claim is:

1. In a process for preparing a composition curable by ultra violet light containing a compound having at least two structural units of the formula:

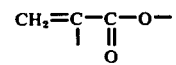

the improvement which comprises incorporating into the composition a compound having the general formula:

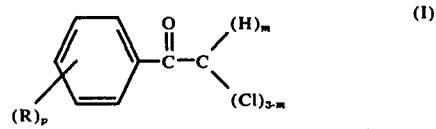

wherein $m = 0$, 1 or 2 and $p$ represents an integer of from 1 to 5 and wherein, when $p = 1$, R represents an alkyl or alkoxy group having at least 4 carbon atoms and, when $p > 1$, R is an alkyl or alkoxy group having together at least 4 carbon atoms in an amount sufficient for curing the composition by ultra violet light.

2. A process according to claim 1, in which the photocatalyst is incorporated into the composition in an amount of 0.5 to 10% by weight, calculated on the compound or mixtures of these compounds to be cured.

3. A process according to claim 2, in which the photocatalyst is incorporated in an amount of 1 to 5% by weight.

4. A composition curable by ultra violet light, comprising a compound having at least two structural units of the formula:

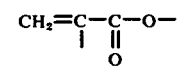

and a photocatalyst having the general formula defined in claim 1.

5. A composition according to claim 4, in which the photocatalyst is present in an amount of 0.5–10% by weight, calculated on the compound or mixtures of compounds to be cured.

6. A composition according to claim 5, containing 1–5% of the photocatalyst.

7. A composition according to claim 4, when prepared by the process of claim 1.

8. A process for curing a composition containing a compound having at least two structural units of the formula:

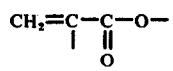

which comprises irradiating with ultra violet light the composition of claim 4.

9. A composition curable by exposure to ultra violet light comprising a di- or polyester of acrylic or methacrylic acid and a catalytic amount of a compound having the formula:

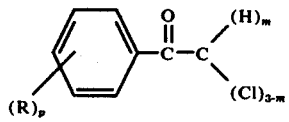 (I)

wherein the symbols R, $p$ and $m$ have the meaning defined in claim 1.

10. In a process for the catalyst curing of a composition containing a compound having at least two structural units of the formula:

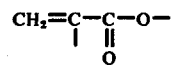

the improvement which comprises exposing the said composition containing a catalytic amount of a compound having the formula:

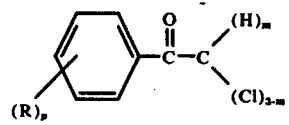 (I)

wherein $m = 0$, 1 or 2 and $p$ represents an integer of from 1 to 5 and wherein, when $p = 1$, R represents an alkyl or alkoxy group having at least 4 carbon atoms and, when p> 1, R is alkyl or alkoxy group having together at least 4 carbon atoms to ultra violet light until the composition is cured.

* * * * *